United States Patent

[11] 3,617,320

[72] Inventor Sung Ki Lee
  Niagara, N.Y.
[21] Appl. No. 750,487
[22] Filed Aug. 6, 1968
[45] Patented Nov. 2, 1971
[73] Assignee Hooker Chemical Corporation
  Niagara Falls, N.Y.

[54] METALLIZING SUBSTRATES
  10 Claims, No Drawings
[52] U.S. Cl.................................................. 106/162,
  106/1, 117/47, 117/138.8, 204/20, 204/30,
  260/33.4, 260/33.6, 260/29.6, 260/32.6, 260/29.3
[51] Int. Cl....................................................... C08b 21/04
[50] Field of Search............................................ 106/1, 162;
  260/33.4, 32.6, 33.6

[56] References Cited
UNITED STATES PATENTS
3,489,585  1/1970  Miller........................... 106/1
3,510,327  5/1970  Miller........................... 106/1

Primary Examiner—Morris Liebman
Assistant Examiner—T. Morris
Attorneys—Peter F. Casella, Donald C. Studley, Richard P. Mueller, James F. Mudd and Edward A. Meilman ABSTRACT: There is provided a two-phase bath for metallizing substrates which comprises a first phase comprising phosphorus in a solvent, and multipurpose agent, and a second phase comprising a metal salt or complex thereof and multipurpose agent, wherein said multipurpose agent is selected from the group consisting of cellulose derivatives, vinyl polymers and copolymers, acrylic polymers, novolacs, oxyalkylated novolacs, oxyalkylated aniline novolacs, oxyalkylated polyols, glycols, polyglycols, siloxanes, natural rosins and gums, and mixtures thereof. The multipurpose agent serves as viscosity modifier, surface and interfacial tension controller, film former and surfactant.

METALLIZING SUBSTRATES

BACKGROUND OF THE INVENTION

There is a rapidly increasing demand for metal-plated articles, for example, in the production of low-cost plastic articles that have a simulated metal appearance. Such articles are in demand in such industries as automotive, home appliance, radio and television and for use in decorative containers and the like.

A new process for metallizing substrates is disclosed in copending application Ser. No. 683,793, filed Nov. 17, 1967 now abandoned. That process involves treating the substrate with phosphorus in an organic solvent to deposit phosphorus at the surface, followed by contacting the treated surface with a metal salt or complex thereof, to form a metal-phosphorus compound. The resulting treated surface can be plated with metals by electroless and/or electrolytic treatment. It has been found that the amount of exposure to the atmosphere between the treatment with phosphorus and contact with the metal salt or complex thereof affects the quality of the metal-phosphorus compound. The greater the air exposure, the less adherent the metal-phosphorus compound is to the surface of the substrate. Inert atmospheres can be provided between the phosphorus and metal salt steps, however, this is an expensive alternative. As a result, it is desirable to keep air exposure to a minimum and this presents a variety of engineering problems in devising a continuous system.

A possible solution to the aforementioned problems would be to combine the phosphorus and metal salt solutions in a unitary, two-phase bath. However, the phosphorus has been found to react with hydroxyl ion to form phosphine and hypophosphoric acid, and the halogenated solvent for the phosphorus could be expected to react with hydroxyl ion to form hydrogen halide, acetylene and/or metal acetylenes. This combination of reaction products presents the possibility of additional side reactions Additionally, interfacial reaction between the phosphorus and metal salt could be expected, which might interfere with the metallizing process.

It has now been found that the phosphorus in organic solvent and metal salt solutions can be combined when a multipurpose agent is also present and the resultant two-phase bath is stabilized against the possibility of side reactions. The multipurpose agent acts as a combination of a viscosity modifier, surface and interfacial tension controller, film former and surfactant. The single bath of this invention eliminates exposure to the atmosphere and the problems attendant thereto. It also results in the metal-phosphorus compound attaining a higher conductivity and a corresponding lower electrical resistance, and also permits a wider range of phosphorus solvents to be employed.

It is the object of this invention to provide a unitary, two-phase bath for metallizing substrates. It is also the object of this invention to provide a two-phase bath in which the possibility of undesirable reactions has been eliminated. A further objective is to eliminate exposure to the atmosphere or an inert atmosphere between the phosphorus and metal salt steps of the metallizing process. A still further objective is to eliminate the necessity of solving the engineering problems attendant to a process wherein it is necessary to expose the phosphorus-treated substrate to air or an inert atmosphere. Another objective is to provide a bath wherein a wide range of solvents for phosphorus can be employed. A still further objective is to provide a process wherein the resultant metal-phosphorus compound has an increased conductivity and decreased electrical resistance with respect to the metal-phosphorus compound produced by the process of Ser. No. 683,793. the invention also has the object of providing a simple process that is applicable to the plating of many different substrates, particularly the thermoplastic polymers. Other objects will become apparent from the following detailed description of the invention.

SUMMARY OF THE INVENTION

This invention relates to a unitary, two-phase bath for the metallizing of substrates. More particularly, this invention relates to a two-phase bath for the metallizing of substrates which comprises a first-phase comprising phosphorus in a solvent, and multipurpose agent, and a second-phase comprising a metal salt or complex thereof and multipurpose agent, wherein said multipurpose agent is selected from the group consisting of cellulose derivatives, vinyl polymers and copolymers, acrylic polymers, novolacs, oxyalkylated novolacs, oxyalkylated aniline novolacs, oxyalkylated polyols, glycols, polyglycols, siloxanes, natural rosins and gums, and mixtures thereof.

In one embodiment, a third phase, which can be water and/or an aqueous solution of a surfactant, is employed on the surface of the two-phase bath.

DESCRIPTION OF THE INVENTION

This invention provides a two-phase bath wherein a first phase comprises phosphorus in a solvent, and multipurpose agent. Elemental white phosphorus, which includes the various impure and commercial grades sometimes referred to as yellow phosphorus, can be employed. Suitable solvents or diluents for the elemental phosphorus are solvents which dissolve elemental phosphorus and which preferably swell the surface of a plastic without detrimentally effecting the surface of the plastic. Such solvents include the halogenated hydrocarbons and halocarbons such as chloroform, methyl chloroform, phenyl chloroform, dichloroethylene, trichloroethylene, perchloroethylene, trichloroethane, dichloropropane, ethyl dibromide, ethyl chlorobromide, propylene dibromide, monochlorobenzene, monochlorotoluene and the like; aromatic hydrocarbons such as benzene, toluene, xylene, ethyl benzene, naphthalene and the like. Liquid, nonhalogenated hydrocarbons having from five to about 50 carbon atoms can also be employed. Typical liquid, nonhalogenated hydrocarbons include pentane, isopentane, neopentane, hexane, 2-methylpentane, 3-methylpentane, heptane, octane, nonane, decane, hexadecane, octadecane, eicosane, and the like. Depending on the solvent employed, the phosphorus solution can be either the upper or lower phase.

The solution concentration is generally in the range from about 0.0001 weight percent of phosphorus based on the weight of the solution up to a saturated solution, and preferably from about 1.5 to about 2.5 percent. In the two-phase bath of this invention, it is also permissible to have an excess of phosphorus in the solution, i.e., to have a saturated solution and additional elemental phosphorus present therein.

In some embodiments, a stabilizer is advantageously employed in the first phase. The stabilizer can be a polyhydroxy compound such as butanetriol, resorcinol, hydroquinone, and the like. Alternatively, the stabilizer can be a combination of a lower aliphatic or cycloaliphatic alcohol and a polyhydroxy aromatic compound, or an alkyl substituted thiourea. Useful alcohols containing one to 18 carbon atoms include methanol, ethanol, butanol, n-amyl alcohol, cyclohexyl alcohol and the like. Typical polyhydroxy aromatic compounds are resorcinol, hydroquinone, pyrocatechol, dihydroxynaphthalene, benzenetriol, and the like polyhydroxybenzene and polyhydroxynaphthalene compounds. The aromatic compounds can be substituted with alkyl (one to five carbon atoms) groups such as 4-t-butyl pyrocatechol; 4,5-ditertiary butylresorcinol; 2,3,5-trimethylhydroquinone; and the like. The alkyl substituted thioureas contain one to four lower alkyl groups of one to four carbon atoms. Useful thioureas include methylthiourea; ethylthiourea; N,N'-di-n-butylthiourea; N,N,N'-tripropylthiourea; N,N',N'-tetramethylthiourea; N,N'dimethyl-N',N'-diethylthiourea; and the like.

The second phase of the two-phase bath comprises a solution of metal salt or complex of a metal salt which is capable of reacting with phosphorus to form a metal phosphide and said multipurpose agent. The term metal phosphide, as used herein, means the metal-phosphorus coating which is formed at the surface of the substrate. Without being limited to theory, the metal phosphide may be an ionic compound or a solution (alloy). The metals generally employed are those of Groups IB, IIB, IVB, VB, VIB, VIIB and VIII of the Periodic Table appearing on pages 60–61 of Lange's Handbook of Chemistry (Revised Tenth Ed.). The preferred metals are copper, silver, gold, chromium, manganese, cobalt, nickel, paladium, titanium, zirconium, vanadium, tantalum, cadmium, tungsten, molybdenum, and the like.

The metal salts that are used in the invention can contain a wide variety of anions. Suitable anions include the anions of mineral acids such as sulfate, chloride, bromide, phosphate, carbonate and the like. Also useful are the anions of organic acids such as formate, acetate, citrate, stearate and the like. Generally, the anions of organic acids contain one to 18 carbon atoms.

The metal salts can be complexed with a complexing agent that produces a solution having a basic pH (>7). Particularly useful are the ammoniacal complexes in which one to six ammonia molecules are complexed with the metal salt, such as $NiSO_4 \cdot 6NH_3$, $AgNO_3 \cdot 6NH_3$, $NiSO_4 \cdot 3NH_3$, $CuSO_4 \cdot 4NH_3$, and the like. Other useful complexing agents include quinoline, amines and pyridine. Useful complexes include compounds of the formula $MX_2Q_2$ wherein M is the metal ion, X is chlorine or bromine and Q is quinoline such as $CoCl_2Q_2$, $NiBr_2Q_2$, $CuCl_2Q_2$ and $ZnCl_2Q_2$. Also useful are the corresponding monoquinoline complexes such as $CoCl_2Q$. Useful amine complexes include mono, bis and tris(ethylenediamine)-, bis(1,2-propanediamine)-, and the like complexes of salts such as $CuSO_4$. Typical pyridine complexes include $NiCl_2(py)_2$ and $CuCl_2(py)_2$ where py is pyridine.

The multipurpose agent employed in the two-phase bath of this invention is present in both phases. It can be added to each phase individually or to either phase because it will diffuse into the phase in which it is absent. The agent performs the combined task of viscosity modifier, surface and interfacial tension controller, film former and surfactant. The multipurpose agent may be anionic, cationic or nonionic. Preferably, it is nonionic. The multipurpose agent is selected from the group consisting of cellulose derivatives, vinyl polymers and copolymers, acrylic polymers, novolacs, oxyalkylated novolacs, oxyalkylated aniline novolacs, oxyalkylated polyols, glycols, polyglycols, siloxanes, natural rosins and gums, and mixtures thereof.

The cellulose derivatives can be the cellulose ethers which are prepared by alkylating cellulose. Typical cellulose ethers include methyl cellulose, ethyl cellulose, butyl cellulose, propyl cellulose, phenyl cellulose, halophenyl cellulose such as chlorophenyl cellulose and bromophenyl cellulose, naphthyl cellulose, benzyl cellulose, carboxymethyl cellulose, hydroxyethyl cellulose, hydroxypropylmethyl cellulose, ethylhydroxyethyl cellulose, carboxymethylhydroxyethyl cellulose, cyanoethyl cellulose, and the like.

Vinyl polymers and copolymers can be employed as the multipurpose agent. Representative compounds include poly(vinyl chloride), poly(vinylidine chloride), poly(vinyl alcohol); poly(vinyl acetate); poly(vinyl trifluorotriacetate); poly(vinyl acetals) such as poly(vinyl butyral), poly(vinyl formalethyl) and the like; poly(vinyl ketals) such as those derived from cyclohexanone; poly(vinyl ethers) such as poly(vinyl methylether), poly(vinyl isobutylether), poly(vinyl stearyl ether), poly(vinyl phenyl ether), and the like; poly(vinyl aldehydes and ketones), such as poly(methyl vinyl ketone), poly(isopropenyl methyl ketone), acrolein (acrylic aldehyde), and the like; nitrogen-containing vinyl polymers such as poly(N-vinyl carbizole), poly(N-vinyl pyrrolidone), poly(N-vinyl pyridine), and the like; and the like vinyl polymers. Copolymers of the foregoing vinyl polymers can also be employed.

The multipurpose agent may be selected from the polymers of the acrylic family, i.e., polymers of acrylic acid and its derivatives. Thus, the agent may be selected from poly acrylic acid and its esters, alpha-haloacrylic acid and its esters, acrylonitrile, acryloyl halides, amides, anhydrides and anilides. Typical compounds include polyacrylic acid, polymethacrylic acid, poly(methyl acrylate), poly(ethyl acrylate), poly(butyl acrylate), acrylate), poly(n-hexyl acrylate), poly(1,1-dihydroperfluoro-butyl acrylate), poly(benzyl acrylate), poly(cyclohexyl acrylate), poly(phenylethyl acrylate), poly(chloroacrylate), poly(fluoroacrylate), poly(methyl methacrylate), poly(ethyl methacrylate), poly(butyl methacrylate), poly(cyclohexyl methacrylate), poly(lauryl methacrylate), poly(allyl methacrylate), poly(ethylene methacrylate), poly(n-amyl methacrylate), poly(ethylenediglycol diacrylate), polyacrylamide, polymethacrylamide, polymethylmethacrylamide, polyethylmethacrylamide, and the like.

The novolacs useful as the multipurpose agent are the well-known fusible, organic solvent soluble condensation product of a phenol and an aldehyde or ketone. The phenol can have the formula:

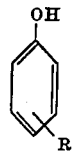

wherein R is selected from the group consisting of hydrogen; fluorine; chlorine; bromine; alkyl of one to 18 carbon atoms; alkenyl of one to 18 carbon atoms; alicyclic of five to 18 carbon atoms; aromatic of six to 18 carbon atoms; aralkyl of six to 18 carbon atoms; alkyl, alkenyl, alicyclic, aromatic, or aralkyl ketones wherein the hydrocarbon portion is as described hereinbefore; alkyl, alkenyl, alicyclic, aromatic or aralkyl carboxylic groups wherein the hydrocarbon portion is as described hereinbefore; and amino groups.

Oxyalkylated novolacs can also be employed as the multipurpose agent. The oxyalkylated novolacs are formed by reacting a novolac, as described above, with a substance which is reactive with the phenolic hydroxyl groups and selected from the group consisting of mono-oxirane ring compounds, alkylene halohydrins and alkylene carbonates. Examples of mono-oxirane ring compounds, alkylene halohydrins and alkylene carbonates include ethylene oxide, propylene oxide, butylene oxide, 2,3-epoxy hexane, methyl glycidyl ether, phenyl glycidyl ether, glycidyl acetate, liminene dioxide, vinyl cyclohexane dioxide, ethylene chloro- or bromohydrins, propylene chloro- or bromohydrins, glycerol chloro- or bromohydrins, ethylene carbonate, propylene carbonate, and the like. When a novolac employed is formed by the reaction of phenol and formaldehyde, the oxyalkylated novolac has the general formula:

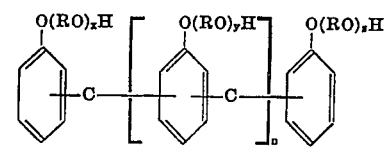

wherein R is hydrocarbon or halocarbon, x is 1 to 100, y is 1 to 100, z is 1 to 100 and n is 1 to 10 or more. The oxyalkylated novolacs useful in this invention are more fully described in Canadian Pat. No. 731,709.

The oxyalkylated aniline novolacs are the same as the oxyalkylated novolacs described hereinbefore except that a primary or secondary amine group is substituted for the phenolic hydroxyl group of the phenol. Thus, the aniline employed can be aniline itself, N-methyl aniline, N,N-dimethylaniline and the various ring substituted analogs thereof.

The oxyalkylated polyols are the equivalents of the oxyalkylated novolacs alcohol containing 2 to 9 hydroxyl groups is employed. Typical polyhydric alcohols which can be used include ethylene glycol, diethylene glycol, triethylene glycol, propylene glycol, dipropylene glycol, glycerol, methyl glycerol, sucrose, sorbitol, mannitol, diglyme, and the like.

Two additional classes of compounds which can be employed as the multipurpose agent are glycols and polyglycols. The polyglycols are prepared from the glycols. For example, polyethylene oxide and polypropylene oxide are prepared from ethylene glycol and propylene glycol, respectively. Typical glycols include ethylene glycol; diethylene glycol; triethylene glycol; tetraethylene glycol; propylene glycol; dipropylene glycol; polypropylene glycol; hexylene glycol; 2-methyl-2-ethyl-1,3-propane diol; 2-ethyl-1,3-hexane diol; 1,5-pentane diol; diodiglycol; 1,3-propane diol; 1,3-butane diol; 2,3-butane diol; 1,4-butane diol; 1,3-butylene glycol; neopentyl glycol; 1,2-dimethyl-1,2-cyclopentane diol; 1,2-cyclohexane diol; 1,2-dimethyl-1,2-cyclohexane diol; ethylene glycol monomethyl ether; diethylene glycol monomethyl ether; and like compounds apparent to those skilled in the art.

Siloxanes can also be employed. These compounds contain the siloxane group:

and have the basic structure:

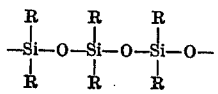

wherein each R is individually selected from the group consisting of alkyl, alkenyl, aryl, haloaryl, and hydrogen. Typical siloxanes include dimethylsiloxane, diethylsiloxane, vinylsiloxane, allylsiloxane, phenylsiloxane, methylphenylsiloxane, chlorophenylsiloxane, fluorophenylsiloxane, methylchlorophenylsiloxane, ethylvinylsiloxane, and the like.

The multipurpose agent can also be natural resins or, as they are often referred to, gums. Typical natural resins include the dammars, which are resinous exudations of certain trees indigenous to the Malay peninsula and contain one or more resin acids and an alpha- and beta-resene (dammar wax) together with small amounts of an essential oil of a terpenic nature; east india's such as pale east india black east india and batu; copals such as mannilias, congo and kauri; gum accroides; elemi; mastic; sandarac; amber or succinite; rosin, and the like.

The foregoing multipurpose agents are used in a form such that they are soluble in both the first and second phases. If the agent itself is not soluble in one or both phases, the corresponding quaternary salts, alkali metal salts or emulsion of the agent can be employed.

The temperature of the phosphorus phase is maintained at about 10° to about 135° centigrade and the temperature of the metal salt phase is maintained at about 30 to about 110° centigrade. Preferably, the temperature of the first zone is 45 to 100° centigrade and the temperature of the second zone is 50 to 100° centigrade. The amount of multipurpose agent employed is about 0.1 to about 50 weight percent based on the total weight of the bath, preferably from 0.5 to 10 percent. In general, as the molecular weight of the multipurpose agent increases, the preferred amount employed decreases. It has been found that as the temperature is lowered, the multipurpose agent retards the rate of reaction within each phase of the two-phase bath. This aspect of the unitary, two-phase bath of this invention is especially advantageous because when the bath is not in use, the temperature is lowered and the possibility of any deleterious reaction occurring is decreased.

In one preferred embodiment, the two-phase bath is provided with a third phase on its surface. The third phase can be water and/or an aqueous solution of a surfactant. This phase is described in my copending application Ser. No. 671,337, filed Sept. 28, 1967 and the continuation-in-part thereof, Ser. No. 759,531, filed Aug. 2, 1968. However, when employed with two-phase bath of this invention, nondiluted surfactant is not employed. The surfactants employed include anionic, cationic and nonionic surfactants such as aliphatic alcohols; aliphatic glycols; polyols; phosphate, carbonate, bicarbonate, hydroxide, sulfate and acid sulfate salts of alkali metals and quaternary nitrogen; alkyl amides such as dialkyl formamides; and the like. Mixtures of surfactants can be used. The aqueous solution of a surfactant contains about 0.1 to about 50 weight percent surfactant based on the total weight of the solution, preferably about 0.5 to about 10 weight percent.

Substrates which can be metallized include plastics and other substantially nonmetallic substrates. Suitable substrates include, but are not limited to, cellulosic and ceramic materials such as cloth, paper, wood, cork, cardboard, clay, porcelain, leather, porous glass, asbestos cement, and the like.

Typical plastic substrates include the homopolymers and copolymers of ethylenically unsaturated aliphatic, alicyclic and aromatic hydrocarbons such as polyethylene, polypropylene, polybutene, ethylenepropylene copolymers; copolymers of ethylene or propylene with other olefins, polybutadiene; polymers of butadiene, polyisoprene, polystyrene and polymers of pentene, hexene, cyclopentadiene, methylstyrene, and the like. Other polymers useful in the invention include chlorinated polypropylene and methylene polyindene, indenecoumarone resins; polymers of acrylate esters and polymers of methacrylate esters, acrylate and methacrylate resins such as ethyl acrylate; alkyd resins; cellulose derivatives such as cellulose acetate, cellulose acetate butyrate, cellulose nitrate, ethyl cellulose; epoxy resins; furan resins (furfuryl alcohol or furfuralketone); hydrocarbon resins from petroleum; isobutylene resins (polyisobutylene); isocyanate resins (polyurethanes); melamine resins such as melamine-formaldehyde; oleo-resins; phenolic resins such as phenol-formaldehyde; polyamide polymers, such as polyamides, polyamide-epoxy and particularly long-chain synthetic polymeric amides containing recurring carbonamide groups as an integral part of the main polymer chain; polyester resins such as unsaturated polyesters of dibasic acids and dihydroxy compounds, and polyester elastomer and resorcinol resins such as resorcinol-formaldehyde; rubbers such as natural rubber, synthetic polyisoprene, reclaimed rubber, chlorinated rubber, polybutadiene; polysulfides (Thiokol); terpene resins; urea resins; vinyl resins such as polymers of vinyl acetal, poly(vinyl chloride); polyformaldehyde; polyphenylene oxide; polymers of diallyl phthalates and phthalates; polycarbonates of phosgene or thiophosgene and dihydroxy compounds such as bisphenols, thermoplastic polymers of bisphenols and epichlorohydrin (trade named Phenoxy polymers); graft copolymers and polymers of unsaturated hydrocarbons and an unsaturated monomer, such as graft copolymers of polybutadiene, styrene and acrylonitrile, commonly called ABS resins; ABS-polyvinyl chloride polymers, recently introduced under the trade name of Cycovin; and acrylic polyvinyl chloride polymers, known by the trade name of Kydex 100.

The polymers can be used in the unfilled condition, or with fillers such as glass fiber, glass powder, glass beads, asbestos, talc, and other mineral fillers, wood flour and other vegetable fillers, carbon in its various forms, dyes, pigments, waxes and the like.

The substrates can be in various physical forms, such as shaped articles, for example, moldings, sheets, rods, and the like; fibers, films and fabrics, and the like.

In a typical process, a substrate is subjected to the phosphorus phase for a period of time which will vary depending upon the nature of the substrate, the temperature, and the composition of said first phase, but is generally in the range of about 1 second to 1 hour or more, preferably in the range of about 1 to 10 minutes, to deposit phosphorus at the surface of the substrate. By this is meant that the phosphorus can be located on the surface, embedded in the surface and embedded beneath the surface of the substrate. The location of the phosphorus is somewhat dependent on the action of the solvent. Thereafter, the substrate is subjected to the metal salt phase for a period which also varies depending on the nature of the substrate, the temperature and the composition of the second phase, but is generally in the range of about 0.1 to 30 minutes, preferably about 5 to 10 minutes. The substrate is then removed and can be subjected to electroless and/or electrolytic plating as described in copending application Ser. No. 683,793.

The following examples serve to illustrate the invention but are not intended to limit it. Unless otherwise specified in this specification and claims, all temperatures are in degrees centigrade and all parts are understood to be expressed in parts by weight.

EXAMPLE 1

A two-phase bath was provided with a temperature monitor and separate heater for each phase. A 2 percent solution of phosphorus in trichloroethylene with 0.01 percent of 1,3-diethyl thiourea was charged into the first (upper) phase and 5 percent nickel sulfate hexahydrate in 6 percent ammonium hydroxide and 2 percent methyl cellulose was charged into the second phase. The multipurpose agent, methyl cellulose, diffused into the phosphorus phase. The phosphorus phase was heated to about 45° centigrade and the metal salt phase was heated to about 70° centigrade. Samples of polypropylene were subjected to the first phase for 1 minute and then withdrawn to the second phase and slowly agitated for 25 minutes. The resulting metal phosphorus compound had a metallic, shiny nickel appearance, a resistance of 100 to 200 ohms per inch, and was completely free from defects.

Several samples were electroplated with 0.3 mil of semibright nickel and 1.2 mils of bright copper. The samples were subjected to a peel test in which a 1-inch wide strip of the metal was pulled away from the plastic surface. The samples exhibited peel strengths of 50 to 70 pounds per inch. Other samples were electroplated with 0.9 mil of semibright nickel, 0.5 mil of bright nickel, and a flash of chromium to yield a mirror bright finish having exceptional thermocycling properties and corrosion resistance.

EXAMPLES 2-9

The procedure of example 1 was repeated except that the following multipurpose agents were employed in place of the methyl cellulose:

| Example | Multipurpose Agent |
|---|---|
| 2 | 290 ethyl cellulose |
| 3 | 5% vinyl acetate |
| 4 | 1% polyacrylamide |
| 5 | 20% ethylene glycol |
| 6 | 3% ethylene glycol |
| 7 | 5% propylene glycol |
| 8 | 0.1% polyethylene glycol ("Polyox") |
| 9 | 2% oxyalkylated novolac having about 1.33 moles of phenol per mole of formaldehyde, about 3.6 moles of polypropylene oxide per phenolic hydroxyl and adjusted to an acid number of about 3 to about 3.5 by phosphoric acid. |

In each instance, a conductive, adherent nickel phosphide was obtained.

EXAMPLE 10

A two-phase bath was prepared by charging 751 parts of phosphorus in 37,642 parts of trichloroethylene into the first (upper) phase; and 1,350 parts of water, 1,215 parts of 28 weight percent aqueous NH$_4$OH and 46 parts of NiSO$_4$·6H$_2$O into the second phase which was in contact with the phosphorus phase. Three hundred parts of ethylene glycol was employed as the multipurpose agent. The bath was provided with a third phase which contained 3,000 parts of water which was in contact with the phosphorus phase but separated from the metal salt phase. A polypropylene sample was degreased by subjection for 2 minutes in 50° centigrade trichloroethylene. The sample was then passed through the water phase into the phosphorus phase, which was being maintained at 55° centigrade. After 5 minutes, the plastic was transferred to the metal salt phase, which had a temperature of 70° centigrade, for 20 minutes under continuous agitation. The resulting plastic had an adherent, shiny nickel phosphide coating which was very conductive (100 ohms per centimeter).

EXAMPLES 11-16

The procedure of example 10 is repeated substituting the following multipurpose agents for the ethylene glycol to obtain conductive, adherent metal phosphides on the surface of the plastic.

| Example | Multipurpose Agent |
|---|---|
| 11 | 3% novolac having about 1.33 moles of phenol per mole of formaldehyde |
| 12 | 2% oxyalkylated aniline novolac having about 1.33 moles of aniline per mole of formaldehyde and about 3.6 moles of propylene oxide per aniline group |
| 13 | 2% product of propylene oxide and sucrose |
| 14 | 2% dimethylsiloxane |
| 15 | 3% rosin |
| 16 | 1% polyethylene glycol and 1% methyl cellulose mixture |

EXAMPLES 17-25

The procedure of example 1 is repeated substituting the following substrates for the polypropylene and the following metal salts for the nickel sulfate.

| Example | Substrate | Metal Salt |
|---|---|---|
| 17 | Polyethylene | Nickel chloride |
| 18 | ABS resin | Copper sulfate |
| 19 | Polyvinylchloride | Copper chloride |
| 20 | Polycarbonate | Silver sulfate |
| 21 | Polystyrene | Cobalt chloride |
| 22 | Wood | Nickel Acetate |
| 23 | Cork | Nickel Acetate |
| 24 | Porcelain (unglazed) | Copper sulfate |
| 25 | Porous clay | Nickel chloride |

EXAMPLES 26-34

In addition to using dihydric alcohols (glycols) as the multipurpose agent, polyhydric alcohols of two to about 10 carbon atoms and two to six hydroxyl groups such as glycerol, hexanetriol, trimethylol propane, pentaerythritol, mannitol and the like, can also be employed. Other useful multipurpose agents include amino alcohols such as methanol amine, ethanol amine, diethanol amine, triethanol amine, propanol amine and the like; and thioalcohols such as thioethanol, thiopropanol, dithioethanol and the like.

The procedure of example 1 was repeated except that the following multipurpose agents were employed in place of the methyl cellulose:

| Example | Multipurpose Agent |
|---|---|
| 26 | 10% glycerol |
| 27 | 20% glycerol |
| 28 | 5% pentaerythritol |
| 29 | 2% pentaerythritol |
| 30 | 5% ethanol amine |
| 31 | 2% diethanol amine |
| 32 | 190 triethanol amine |
| 33 | 2% thioethanol |
| 34 | 1% dithioethanol |

In each instance, a conductive, adherent nickel phosphide was obtained.

Various changes and modifications can be made in the process and products of this invention without departing from the spirit and scope of the invention. The various embodiments of the invention disclosed herein serve to further illustrate the invention but are not intended to limit it.

I claim:

1. A unitary two-phase bath comprising a first phase comprising phosphorus in a solvent and a multipurpose agent and a second phase comprising a metal salt or complex thereof and a multipurpose agent wherein said multipurpose agent is selected from the group consisting of cellulose ethers, vinyl polymers and copolymers, acrylic polymers, novolacs, oxyalkylated novolacs, oxyalkylated aniline novolacs, oxyalkylated polyols, glycols, polyglycols, polyhydric alcohols containing three to six hydroxyl groups, aminoalcohols, thioalcohols, siloxanes, natural resins and gums, and mixtures thereof, and wherein the metal is selected from Groups IB, IIB, IVB, VB, VIB, VIIB and VIII of the Periodic Table.

2. The bath of claim 1 wherein the cellulose ether is ethyl cellulose.

3. The bath of claim 1 wherein the multipurpose agent is ethylene glycol.

4. The bath of claim 1 wherein the multipurpose agent is vinyl acetate.

5. The bath of claim 1 wherein the multipurpose agent is polyethylene oxide.

6. The bath of claim 1 wherein the solvent is trichloroethylene, the metal salt is nickel sulfate, and the multipurpose agent is a cellulose ether.

7. The bath of claim 6 wherein the cellulose ether is methyl cellulose.

8. The bath of claim 1 having a third phase thereon, wherein the third phase comprises at least one member of the group of water and aqueous solutions of a surfactant.

9. The bath of claim 8 wherein the third phase comprises water.

10. The bath of claim 8 wherein the third phase comprises an aqueous solution of a dialkyl formamide.

* * * * *

PO-1050
(5/69)

UNITED STATES PATENT OFFICE
CERTIFICATE OF CORRECTION

Patent No. 3,617,320  Dated  November 2, 1971

Inventor(s)  Sung Ki Lee

It is certified that error appears in the above-identified patent and that said Letters Patent are hereby corrected as shown below:

Column 4, line 6, change "(butyl acrylate), acrylate)" to read ---(butyl acrylate)---.
Column 7, line 50 change "290 ethyl" to read ---2% ethyl---.

Signed and sealed this 11th day of April 1972.

(SEAL)
Attest:

EDWARD M. FLETCHER, JR.
Attesting Officer

ROBERT GOTTSCHALK
Commissioner of Patents